Aug. 12, 1941.  H. P. M. QUILLERY  2,252,524
STEERING WHEEL
Filed June 19, 1939
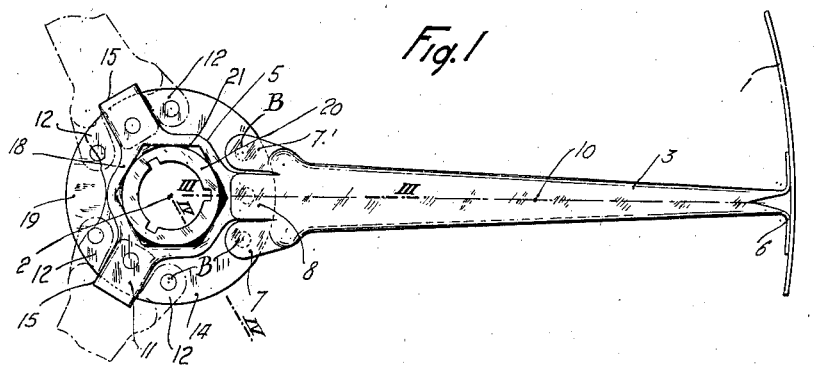
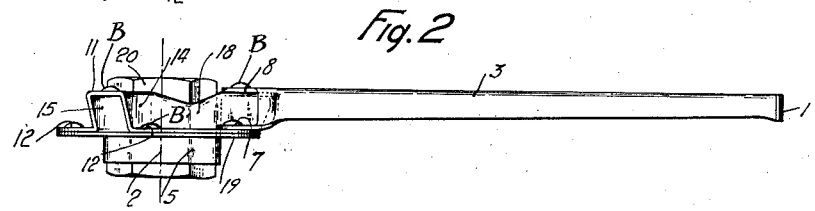
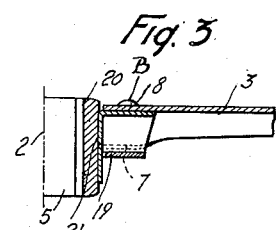 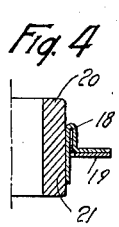 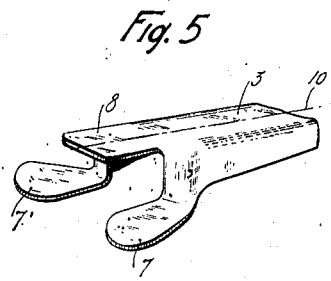
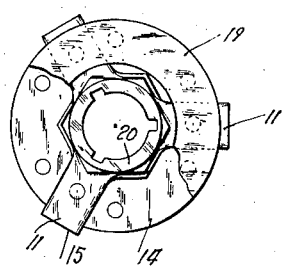 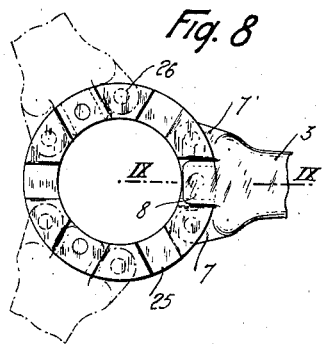
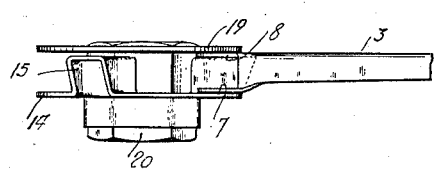 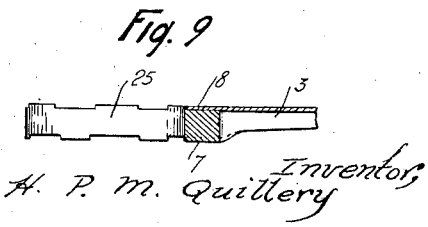
Inventor,
H. P. M. Quillery
By: Glascock Downing & Seebold
Attys.

Patented Aug. 12, 1941

2,252,524

UNITED STATES PATENT OFFICE 2,252,524

STEERING WHEEL

Henri Paul Marcel Quillery, La Garenne-Colombes, France

Application June 19, 1939, Serial No. 279,954
In France June 24, 1938

9 Claims. (Cl. 74—552)

My invention relates to steering wheels of the type comprising a metallic frame, which is formed by a rim, a hub and spokes extending between said hub and said rim and terminally secured thereto, said metallic frame being generally completely or partly coated or embedded in a plastic material such as ebonite, and my invention concerns more particularly said frame.

The main object of my invention is to provide a light, rugged and compact construction of a frame of the character described.

A further object of my invention is to provide a very rigid assembly between the hub and the spokes of a frame of the type described preferably obtained by electric resistance welding.

A still further object of my invention is to provide a frame of the character described, the hub of which is of very small diameter, thereby ensuing an economy of material both for forming the frame and for coating the latter so that the weight of the finished steering wheel is substantially decreased.

The metallic frame for a steering wheel is formed according to a preferred embodiment of my invention, by a rim connected to a hub by spokes and in which on the one hand each of said spokes is formed by a stamped metal plate having along the most part of its length the form of a channel the middle part of said channel being integral at its inner end with a central bearing surface which preferably projects from the said channel and is united with said middle part, and each of the two arms of said channel being respectively integral at its inner end with a lateral bearing surface projecting from the said channel and distant from said central bearing surface in a direction parallel with the axis of said rim, said bearing surfaces being located substantially at right angles to said axis, and, on the other hand, the hub is provided with two series of supporting surfaces, substantially plane, arranged about said axis and to which said central and lateral bearing surfaces are respectively secured preferably by welding.

The aforesaid bearing surfaces or the supporting surfaces may each be provided beforehand with a boss which facilitates the fixing of the spokes by electric resistance welding.

The above named and other objects and advantages of my invention reside in certain features of construction, arrangement and combination of parts as will hereinafter be more fully described and pointed out in the appended claims.

Referring to the drawing which is given solely by way of example and relates to frames having three spokes:

Fig. 1 is a partial plan view of a frame according to an embodiment of the invention, only one spoke being in position and a portion of the two others being shown in chain dotted lines;

Fig. 2 is a corresponding side view;

Fig. 3 and Fig. 4 are sections along the lines III—III and IV—IV of Fig. 1;

Fig. 5 is a perspective view of the inner end of a spoke;

Fig. 6 is a plan view of a modification with the hub partly broken away;

Fig. 7 is a corresponding side view, only one spoke being in position;

Fig. 8 is a plan view similar to Fig. 1 of another modification;

Fig. 9 is an elevation partly broken away along the line IX—IX of Fig. 8.

According to the embodiment shown in Figs. 1 to 5, the frame of the steering wheel comprises a circular rim 1 the axis of which is at 2 and which is connected by three identical spokes 3 to a hub 5. Each of said spokes is formed, as shown in Figs. 1 and 5, by a stamped channel shaped metal plate which progressively widens out from the rim 1 to the hub 5 and is fixed to the rim by means of two lugs 6 forming one of its ends. At its inner end, each spoke 3 is terminated by three bearing surfaces formed by lugs 7, 7' and 8, viz.: two lateral bearing surfaces formed by lugs 7 and 7' integral with the arms of the channel plate and which are symmetrical relatively to the longitudinal axis 10 of the spoke 3 and are located substantially in a plane perpendicular to the axis 2, and a central bearing surface formed by a medial lug 8 integral with the middle part of said channel and which is symmetrical relatively to the axis 10 and parallel to the aforesaid lugs 7 and 7' and projects from the said channel. The lug 8 is distant from the plane of the lugs 7, 7' in the axial direction. These three lugs are of substantially the same length and their arrangement is such that when the spoke is in position, they are substantially equidistant from the axis 2.

The hub 5 is provided with two series of supporting surfaces, viz.: a first series 11 on each of which is welded a medial lug 8, and a second series 12, spaced apart from the former, in a direction parallel with the axis 2 and at the same distance from this latter, and on which are welded the lateral lugs 7 and 7', the weld points being indicated by small circles in Fig. 1. The supporting surfaces may be provided with bosses B, Figs. 1 to 3 for the purpose.

The supporting surfaces 11 and 12 are provided on an annular sheet of metal 14 forming an integral part of the hub 5. The sheet 14 forms about the axis 2 corrugations in the shape of castellations 15, the upper surface of each castellation forming a supporting surface 11 whereas the strip connecting two castellations offers two supporting surfaces 12.

The sheet 14 is provided at its inner periphery, concentrically with the axis 2 and between two castellations, with reinforced parts 18 which ensure the strength of said castellations. Increased rigidity is provided by a stiffening washer 19 welded to the under side of the flats.

Said hub is provided with a usual part adapted to engage the end of a steering tube and comprising a tube 20 which is fixed concentrically with the axis 2 in a housing 21 forming the central part of the sheet 14.

According to the modification shown in Figs. 6 and 7, the annular sheet of metal 14 forms about the axis of the hub a number of corrugations in the shape of castellations 15, the upper surface of each castellation forming a supporting surface 11 for the lugs 8, and the strips connecting the castellations offer supporting surfaces for the lugs 7, 7'. A stiffening washer 19 is welded together with the lugs 8 on said surfaces 11 in order to insure the rigidity of the whole.

In Figs. 8 and 9, a simpler embodiment has been shown in which the supporting surfaces for the lugs 7, 7' and 8 are respectively located on the upper and the lower surface of a ring 25 of corresponding thickness, said supporting surfaces being provided with bosses 26 which are formed during manufacture so as to facilitate welding. Said ring can be fixed on a steering column by means of screw and nut arrangements.

While I have described what I at present consider preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim is:

1. A metallic frame for a steering wheel comprising in combination a hub, a rim and spokes extending between said hub and said rim and terminally secured thereto, spokes each of which is formed by a stamped metal plate having along at least the most part of its length substantially the form of a channel having a middle part and two arms, the inner end of the middle part of said channel being provided with a central bearing surface located substantially at right angles to the axis of said rim and the inner end of each of said arms being provided with a lateral bearing surface, projecting from said channel, the two lateral bearing surfaces of each spoke being substantially in the same plane which is distant from said central bearing surface in a direction parallel with said axis and a hub which is provided with two series of supporting surfaces substantially plane, arranged about said axis in registry with said central and lateral bearing surfaces respectively secured thereto, said hub including a stamped metal plate, means adapted to engage a steering column being located at the centre of said last named plate.

2. In a metallic frame for a steering wheel comprising in combination a hub, a rim and spokes extending between said hub and said rim and terminally secured thereto, spokes each of which is formed by a metal plate, three bearing surfaces rigid with the inner end of each of said spokes and projecting from said end substantially at right angles to and at the same distance from the axis of said rim, one of said bearing surfaces called central bearing surface being carried by the middle part of said spoke and the two other called lateral bearing surfaces being substantially in the same plane which is distant from said central bearing surface in a direction parallel with said axis, and a hub at least the outer part of which is of annular shape, the surfaces limiting the outside of said outer part including two series of supporting surfaces substantially plane arranged about said axis in registry with said central and lateral bearing surfaces respectively secured thereto.

3. A metallic frame for a steering wheel as claimed in claim 2 at least the outer part of the hub of which includes an annular sheet of metal of corrugated shape so as to offer castellated projections forming at their top parts one series of supporting surfaces, the other series of supporting surfaces being formed between the castellations.

4. A metallic frame for a steering wheel as claimed in claim 2 at least the outer part of the hub of which includes an annular sheet of metal of corrugated shape so as to offer castellated projections forming at their top parts one series of supporting surfaces, the other series of supporting surfaces being formed between the castellations, a stiffening washer being fitted on at least one of the two series of supporting surfaces.

5. In a metallic frame for a steering wheel comprising in combination a hub, a rim and spokes extending between said hub and said rim and terminally secured thereto, spokes each of which is formed by a stamped metal plate having along at least the most part of its length substantially the form of a channel having a middle part and two arms, a lug projecting from the end of said middle part and united therewith, a further lug carried by each arm of said channel and projecting from said latter, said further lugs being substantially parallel with said first named lug and distant therefrom in a direction parallel with said axis, said lugs being substantially at the same distance from said axis, and a hub at least the outer part of which includes an annular sheet of metal of corrugated form so as to offer castellated projections forming at their top part one series of supporting surfaces each of which is in registry with one of the first named lugs secured thereto, and between the castellations a further series of supporting surfaces in registry with the further lugs secured thereto.

6. A metallic frame for a steering wheel comprising in combination a hub, a rim and spokes extending between said hub and said rim and terminally secured thereto, spokes each of which is formed by a stamped metal plate having along at least the most part of its length substantially the form of a channel having a middle part and two arms, the inner end of the middle part of said channel being provided with a central bearing surface located substantially at right angles to the axis of said rim and the inner end of each of said arms being provided with a lateral bearing surface, projecting from said channel, the two lateral bearing surfaces of each spoke being substantially in the same plane which is distant from said central bearing surface in a direction parallel with said axis and a hub which is provided with two series of supporting surfaces substantially plane, arranged about said axis in registry with said central and lateral bearing surfaces respectively secured thereto, the hub including at least one annular stiffening washer fitted on at least one of the two series of supporting surfaces.

7. A metallic frame as claimed in claim 2 in which said hub includes a stamped metal plate, means adapted to engage a steering column being located at the center of said last named plate.

8. In a metallic frame for a steering wheel comprising in combination a hub, a rim and spokes extending between said hub and said rim and terminally secured thereto, spokes each of which is formed by a metal plate, three bearing surfaces rigid with the inner end of each of said spokes and projecting from said end substantially at right angles to and at the same distance from the axis of said rim, one of said bearing surfaces called central bearing surface being carried by the middle part of said spoke and the two other called lateral bearing surfaces being substantially in the same plane which is distant from said central bearing surface in a direction parallel with said axis, and a hub the outer part of which includes a ring coaxial with said axis, and the thickness of which in a direction parallel with said axis is substantially equal to the distance between the central bearing surface and the plane of the two lateral bearing surfaces of each spoke which are secured respectively to the faces of said ring.

9. A steering wheel including a metallic frame adapted to be at least partially coated or embedded in a plastic material such as ebonite, and comprising in combination a hub, a rim and spokes extending between said hub and said rim and terminally secured thereto, spokes each of which is formed by a metal plate, three bearing surfaces rigid with the inner end of each of said spokes and projecting from said end substantially at right angles to and at the same distance from the axis of said rim, one of said bearing surfaces called central bearing surface being carried by the middle part of said spoke and the two other called lateral bearing surfaces being substantially in the same plane which is distant from said central bearing surface in a direction parallel with said axis, and a hub at least the outer part of which is of annular shape, the surfaces limiting the outside of said outer part including two series of supporting surfaces substantially plane arranged about said axis in registry with said central and lateral bearing surfaces respectively secured thereto.

HENRI PAUL MARCEL QUILLERY.